United States Patent [19]
Nakamura et al.

[11] Patent Number: 5,990,190
[45] Date of Patent: Nov. 23, 1999

[54] PHOTOSENSITIVE RESIN COMPOSITION FOR PHOTO-CAST-MOLDING

[75] Inventors: Shohei Nakamura; Kousi Anai, both of Fuji, Japan

[73] Assignee: Asahi Kasei Kogyo Kabushiki Kaisha, Osaka, Japan

[21] Appl. No.: 08/892,952

[22] Filed: Jul. 15, 1997

[30] Foreign Application Priority Data

Jul. 17, 1996 [JP] Japan .................................. 8-205466
Jul. 17, 1996 [JP] Japan .................................. 8-205467

[51] Int. Cl.$^6$ .............................. C08K 3/22; C08K 3/26; C08F 2/46
[52] U.S. Cl. ................................ 522/81; 522/83; 522/75; 522/96; 522/97; 522/107
[58] Field of Search ................................ 522/107, 97, 96, 522/75, 81, 83, 64; 525/168, 20; 523/513; 96/115

[56] References Cited

U.S. PATENT DOCUMENTS

| | | | |
|---|---|---|---|
| 3,644,120 | 2/1972 | Kai et al. ................................ | 96/115 |
| 4,255,464 | 3/1981 | Van Der Kallen ...................... | 427/54.1 |
| 4,265,723 | 5/1981 | Hesse et al. ........................ | 204/159.23 |
| 4,425,287 | 1/1984 | Hesse et al. .............................. | 264/22 |
| 4,985,472 | 1/1991 | Aosai et al. .............................. | 522/64 |
| 5,104,983 | 4/1992 | Stock et a l. ........................... | 524/141 |
| 5,176,985 | 1/1993 | Seitz et al. .............................. | 430/284 |
| 5,326,822 | 7/1994 | Hesse et al. ............................. | 525/168 |

FOREIGN PATENT DOCUMENTS

| | | |
|---|---|---|
| 0 498 592 | 8/1992 | European Pat. Off. . |
| 2 279 656 | 1/1995 | European Pat. Off. . |
| WO 96 15179 | 5/1996 | European Pat. Off. . |
| 55-124 624 | 9/1980 | Japan . |
| 57-125 233 | 8/1982 | Japan . |
| 61-019 624 | 1/1986 | Japan . |
| 03 114 711 | 5/1991 | Japan . |
| 04 122 615 | 4/1992 | Japan . |

*Primary Examiner*—James J. Seidleck
*Assistant Examiner*—Sanza L. McClendon
*Attorney, Agent, or Firm*—Pennie & Edmonds LLP

[57] ABSTRACT

A photosensitive resin composition for cast molding, which has an ultraviolet transmittance of 0.05–5% as measured at a 1-mm thickness.

9 Claims, 1 Drawing Sheet

PHOTOSENSITIVE RESIN COMPOSITION FOR PHOTO-CAST-MOLDING

TECHNICAL FIELD

The present invention relates to a photosensitive resin composition for photo-cast-molding, used in production of duplicate model by cast molding.

BACKGROUND ART

Small-number duplication of trial manufacture model and small-amount production of duplicate model have heretofore been conducted by producing a mold from a silicone rubber with a master model, casting a thermosetting resin into the mold in vacuum, and thermosetting the cast resin. This thermosetting resin is ordinarily a two-pack type and the time from mixing of the two packs to the start of setting (curing) is short; therefore, there have been problems that the casting of the thermosetting resin into the silicone rubber-made mold must be conducted in a short time and moreover, even if the casting is conducted with care, curing starts during the casting operation to generate defective in some cases. There have also been problems that the container used for mixing or casting of the thermosetting resin must be washed each time after the use before the resin is cured (this requires a complicated operation) and, moreover, a long time of about 2 hours is required for the heat-curing of the thermosetting resin (this restricts the times of duplication per day).

Meanwhile, JP-A-58-80587 discloses a method for duplication of plastic case for watch by casting an ultraviolet-curing one-pack type synthetic resin for cast molding into a transparent mold made of a silicone rubber or the like and applying an ultraviolet light under vacuum. In this method, as the ultraviolet-curing resin, there are used a synthetic resin (e.g. spiran resin) for cast molding containing benzophenone as sensitizer, a reaction accelerator-containing unsaturated polyester resin, etc.

Further, JP-A-3-114711 proposes a method for casting a photosensitive resin into a transparent silicone rubber mold and applying an ultraviolet light to cure the resin, wherein the photosensitive resin is a mixture of diacrylate of bisphenol A-ethylene oxide adduct, acrylate of phenyl glycidyl ether and a photopolymerization initiator.

Further, JP-A-7-124962 proposes a method for producing a plastic molded article, which method comprises the steps of casting, into a transparent silicone rubber made mold, an active energy ray-curing liquid resin composition comprising a urethanepoly(meth)acrylate having at least two (meth) acryloyloxy groups, a particular diallyl compound, an aliphatic polythiol compound having at least two thiol groups, and an active energy ray polymerization initiator, and irradiating the above liquid resin composition with an active energy ray to cure the resin composition.

Furthermore, the present applicant proposed a photosensitive resin composition wherein the cracking tendency of the above photosensitive resins is alleviated (JP-A-8-244044 and JP-A-8-323778).

While duplicate models produced by cast molding are required to have a high dimensional accuracy, there have remained a problem that the dimension of duplicate model produced with a photosensitive resin is smaller than the dimension of master model because the photosensitive resin gives rise to shrinkage during ultraviolet curing. The shrinkage can be made up for by making a master model of larger size, but production of a trial manufacture model for initial shape evaluation and a master model used for duplication, in different dimensions results in low efficiency, which has restricted the applications of such an approach.

Duplicate models of trial manufacture model are desired, in some cases, to have, for example, an opaque white color such as possessed by ABS, depending upon the application. However, addition of, for example, titanium oxide, carbon black or the like to a photosensitive resin in order to allow the resin to have an opaque color results in reduced photosensitivity, which restricts the maximum possible thickness of duplicate model; thus, allowing a photosensitive resin to have opaqueness with no problems has been difficult. Coloring of duplicate model by coating has also been conducted. This, however, has had problems in that the coating step increases the number of total operational steps and the chipping, flaking, or peeling of coating applied, when occurring, makes the duplicate model look bad.

When the photosensitive resin composition casted into a silicone rubber mold is irradiated, for curing of the resin composition, with an ultraviolet light emitted from an exposure apparatus whose light sources are provided above and below the mold, such as used in production of printing plate, there has been a problem in that the portions of the resin composition corresponding to the sides of model produced are not sufficiently cured, generating defectives.

In producing a mold with a silicone rubber, a long time of 10 hours or more is required to cure the mold. Therefore, a silicone rubber curable in a shorter time has been desired by model producers who wish to produce and evaluate duplicate models in a period as short as possible after the designing of trial manufacture model.

Objects of the present invention are to provide, in a method for production of duplicate model by producing an ultraviolet-transmittable silicone rubber-made mold using a master model, casting a photosensitive resin composition into the mold, and applying an ultraviolet light to cure the resin composition, a photosensitive resin composition for cast molding which enables production of a duplicate model having high dimensional accuracy, high hardness and cracking resistance, and also a photosensitive resin composition for cast molding which enables production, by ultraviolet curing, of even a duplicate model having an opaque color and yet a large thickness. Other object of the present invention is to provide a photosensitive resin composition for cast molding which is suitable for production of a duplicate model in a simple operation in a short period. Still other object of the present invention is to provide a method for production of a duplicate model, which uses an exposure apparatus capable of producing a completely cured three-dimensional model.

DISCLOSURE OF THE INVENTION

The present inventors found out that the above objects can be achieved by allowing a photosensitive resin composition to have an ultraviolet transmittance of 0.05–5% as measured at a 1-mm thickness. The present invention has been completed based on the finding.

BEST MODE FOR CARRYING OUT THE INVENTION

Figure 1:
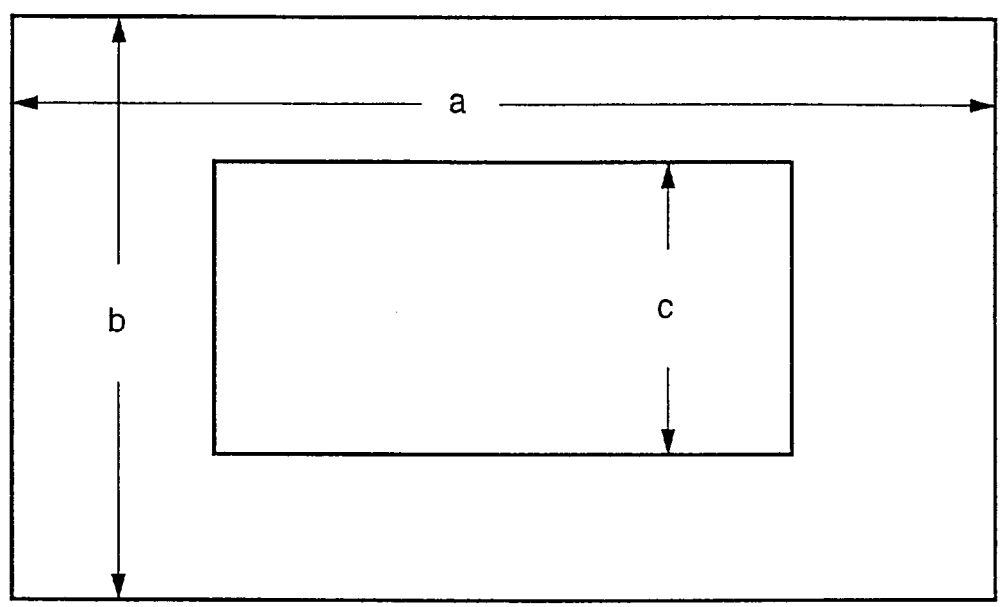
FIG. 1 is a plan view showing the shape of the master model used in Examples of the present invention.

The photosensitive resin composition for cast molding, used in the present invention is a photosensitive resin composition having an ultraviolet transmittance of 0.05–5% as measured at a 1-mm thickness.

The ultraviolet transmittance referred to in the present invention is obtained from the ratio of the intensity of ultraviolet after transmission to the intensity of ultraviolet before incidence when the ultraviolet ray which an ultraviolet fluorescent lamp of central wavelength of 360–370 nm emits is shed on a photosensitive resin composition for cast-molding adjusted to a thickness of 1 mm. More specifically, the ultraviolet transmittance is obtained from $B'÷A'×100$, provided that the intensity of ultraviolet ray before incidence to the photosensitive resin composition for cast-molding adjusted to an optical path length of 1 mm is defined as A' and the intensity of ultraviolet after transmission through the optical path is defined as B'.

In actual measurements thereof, the intensity A of the ultraviolet ray which passes through two sheets of soda-lime glass each onto which a polyester film is laminated is first determined and then the photosensitive resin composition for cast-molding is interposed between those two sheets of soda-lime glass each onto which the polyester film is laminated to determine to intensity B of the ultraviolet ray after it passes through those sheets. The ultraviolet transmittance is obtained from $B÷A×100$ using these intensities A and B.

The ultraviolet absorber added to the photosensitive resin composition to control its ultraviolet transmittance can be any as long as it has absorption in an ultraviolet region, and is used by being dissolved or dispersed in the photosensitive resin composition. In the present invention, even a compound which has a low ultraviolet absorptivity by itself but, when dispersed in the photosensitive resin composition, can reflect or scatter an ultraviolet light applied and consequently can lower the ultraviolet transmittance of the composition, can be used as an ultraviolet absorber.

The ultraviolet absorber includes a benzotriazole type ultraviolet absorber, a benzophenone type ultraviolet absorber, a cyanoacrylate type ultraviolet absorber, etc. Specific examples of the ultraviolet absorber are 2-(2'-hydroxy-5'-methylphenyl)benzotriazole, 2-(2'-hydroxy-5'-tert-butylphenyl)benzotriazole, 2-(2'-hydroxy-3'-tert-butyl-5'-methylphenyl)-5-chlorobenzotriazole, 2-(2'-hydroxy-3', 5'-di-tert-butylphenyl)-5-chlorobenzotriazole, 2-(2'-hydroxy-3',5'-di-tert-amylphenyl)benzotriazole, 2,4-dihydroxybenzophenone, 2-hydroxy-4-methoxybenzophenone, 2,2'-dihydroxy-4-methoxybenzophenone, 2,2-dihydroxy-4,4'-dimethoxybenzophenone and 2-ethylhexyl-2-cyano-3,3'-diphenyl acrylate.

Besides the above compounds, there can also be used commercial dyes and pigments, having absorption in an ultraviolet region.

Many of the duplicate models produced by photo-cast-molding are required to have a color such as opaque white, black or the like in place of water white. To respond to such a requirement, it is preferable to use, as an ultraviolet transmittance-controlling agent, a coloring material or a material capable of producing an opaque feeling.

The ultraviolet transmittance-controlling agent having, in addition to the ultraviolet absorptivity, an ability of allowing a duplicate model obtained to have an opaque feeling or a color, includes inorganic fillers such as calcium carbonate, magnesium hydroxide, magnesium carbonate, magnesium oxide, zinc oxide and the like. Titanium oxide, carbon black, etc. can also be used as an ultraviolet transmittance-controlling agent; however, since they have a high ultraviolet absorptivity, they cannot be added in such an amount that sufficient opaque feeling or sufficient coloring is obtained; therefore, they must be used in combination with a dye or the like when coloring is desired as well.

For coloring of a duplicate model, it is also effective to use a compound capable of changing its color or developing a color upon irradiation with an ultraviolet light. A leuco dye is particularly preferable because its combination use with a compound generating an acid upon irradiation with an ultraviolet light can develop a dark color. A leuco dye is almost water white and per se can be used as an ultraviolet transmittance-controlling agent and, after the application of ultraviolet light, can produce a light-impermeable black color by the action of an acid generated. In general, the timing at which a compound (capable of) generating an acid upon irradiation with an ultraviolet light actually generates an acid, is later than the timing at which a photopolymerization initiator (capable of) generating a free radical upon irradiation with an ultraviolet light to initiate polymerization actually generates a free radical; therefore, the ultraviolet transmittance of the present photosensitive resin composition cast into a mold is kept substantially in the range specified by the present invention while the photosensitive resin composition is photo-cured by photopolymerization, and color development takes place by subsequent continued ultraviolet application or by additional ultraviolet application to a duplicate model taken out of the mold; as a result, curing in a large thickness is achieved favorably even when an ultraviolet transmittance-controlling agent is used which can be colored in an almost completely light-impermeable black color.

The leuco dye includes 3-butylamino-6-methyl-7-anilinofluoran, 3-diethylamino-6-methyl-7-anilinofluoran, 3-diethylamino-6-methyl-7-xylidinofluoran, 3-(4-diethylamino-2-ethoxyphenyl)-3-(1-ethyl-2-methylindole-3-yl)-4-azaphthalide, etc. 3-Butyl-6-methyl-7-anilinofluoran is most preferable in view of the black color obtained.

As the compound generating an acid upon irradiation with an ultraviolet light, there can be used commercial photo-induced cationic polymerization initiators such as triarylsulfonium hexafluorophosphate and the like.

As the ultraviolet transmittance-controlling agent which can give an opaque white, calcium carbonate is most preferable.

Use of calcium carbonate or a leuco dye as an ultraviolet transmittance-controlling agent to allow a duplicate model to have a color is particularly useful because there is a strong request for that a duplicate model produced by photo-cast-molding has a beige to opaque white color or a black color.

The inorganic filler such as calcium carbonate or the like has no particular restriction as to the shape as long as it is dispersible in the photosensitive resin composition, and a particulate or fibrous inorganic filler can be used. The particulate inorganic filler preferably has a particle diameter of ordinarily 10 $\mu$m or less. A particulate inorganic filler of large particle diameter, when mixed into the photosensitive resin composition and stored, tends to settle. Therefore, a particulate inorganic filler having an average particle diameter of 5 $\mu$m or less, preferably 2 $\mu$m or less is suitable. The fibrous inorganic filler preferably has a fiber thickness of 1 $\mu$m or less and a fiber length of 5 $\mu$m or more because the photosensitive resin composition for cast molding containing such a fibrous inorganic filler is unlikely to cause settling when stored for a long period. A fibrous inorganic filler having a fiber thickness of 0.2 $\mu$m or less and a fiber length of 15 $\mu$m or more is more preferable.

In view of the settling tendency of the inorganic filler (e.g. calcium carbonate) in the photosensitive resin composition for photo-cast-molding during storage, a fibrous inorganic filler is superior to a particulate or spherical inorganic filler because the former has a lower settling tendency.

Even when the inorganic filler contained in the photosensitive resin composition has caused settling, the composition becomes usable by restirring.

The inorganic filler such as calcium carbonate or the like is added in an amount of 3–20 parts by weight per 100 parts by weight of the photosensitive resin composition so that the resulting mixture has an ultraviolet transmittance specified by the present invention. With an amount smaller than that, no sufficient opaqueness is obtained; with an amount larger than that, the resulting duplicate model has a small elongation at break and tends to crack, or is not sufficiently cured at thick portions. A preferable amount is 5–15 parts by weight.

A dye or the like can be used in combination with an inorganic filler such as calcium carbonate or the like to allow a duplicate model obtained to have a controlled color.

Obtainment of the photosensitive resin composition for cast molding according to the present invention by adding an inorganic additive to a photo-sensitive resin composition can be conducted by adding an inorganic filler to a photosensitive resin composition, followed by stirring and dispersion, or by adding an inorganic additive when a photosensitive resin composition is produced by mixing individual components. At that time, mixing with heating is possible because the viscosity of the photosensitive resin composition is lowered and mixing becomes easier.

The inorganic additive is not substantially soluble in the photosensitive resin composition and reflects or scatters an incident light; thereby, the photosensitive resin composition is made opaque. Calcium carbonate, magnesium carbonate, magnesium hydroxide, magnesium oxide, etc., which have low ultraviolet absorptivity, scatter an ultraviolet light applied to reduce ultraviolet transmittance and can allow a photosensitive resin composition to have a desired ultraviolet transmittance. The scattered ultraviolet light is absorbed by the photopolymerization initiator contained in the photosensitive resin composition and contributes to the initiation of the curing reaction of the composition. As a result, even the thick portions of the resin composition can be cured and an opaque and thick duplicate model can be obtained by the curing. Thus, contradictory properties can be accompanied together favorably. Calcium carbonate is particularly preferable because it can provide a duplicate model having an completely opaque color and a desired ultraviolet transmittance.

Duplicate models have a thickness of ordinarily 2– 3 mm and, in some cases, about 4–6 mm. The present photosensitive resin composition for cast molding can produce a duplicate model having such a thickness.

Surprisingly, a photosensitive resin composition for cast molding, having an ultraviolet transmittance of 0.05–5% as measured at a 1-mm thickness gives a duplicate model having an improved dimensional accuracy. This is because since the intensity of ultraviolet light differs greatly at the light-incidence surface of the photosensitive resin composition casted into a mold and at the inside of the resin composition, various portions of the resin composition are cured in greatly different times, that is, peripheral portions are cured first and the resin volume reduced as a result of curing and shrinkage is made up for through the center of uncured portion and, as a result, the duplicate model formed retains the original dimension of the master model.

The dimensional error of duplicate model is required to be in a range of ±0.3% relative to the master model. This requirement can be met with the present resin composition.

The ultraviolet transmittance of the present photosensitive resin composition for cast molding is in a range of 0.05–5%. The transmittance is preferably 0.2–3% because such a transmittance enables production of a duplicate model of large thickness in a short curing time with an intended dimensional accuracy being maintained.

The present photosensitive resin composition for cast molding has no particular restriction as to the composition. However, in view of the balance with other properties such as hardness and cracking resistance, to be possessed by a duplicate model obtained, it is preferable to use a photosensitive resin composition containing, as the essential components, (1) a polymer of 800–9,000 molecular weight having ethylenically unsaturated bond in the molecule, and (2) an ethylenically unsaturated compound having a molecular weight of smaller than 800.

This photosensitive resin composition ordinarily contains a photopolymerization initiator.

As the polymer of 800–9,000 molecular weight having ethylenically unsaturated bond in the molecule, there can be mentioned an unsaturated polyurethane, an unsaturated polyester, etc. An unsaturated polyurethane is preferred from the standpoint of the balance of hardness and cracking resistance.

The unsaturated polyester is obtained by dehydration condensation reaction of a diol compound with at least one dicarboxylic acid compound that contains a dicarboxylic acid compound having an ethylenic unsaturated bond.

The unsaturated polyurethane is obtained by reacting a diol compound with a diisocyanate compound and then reacting therewith a compound having hydroxyl or amino group and ethylenically unsaturated bond or a compound having isocyanate group and ethylenically unsaturated bond.

In the process which comprises first synthesizing a polyurethane having an isocyanate group at each terminal and then reacting it with a compound having hydroxyl group and ethylenically unsaturated bond, it is preferable to add the compound having hydroxyl group and ethylenically unsaturated bond so that the number of hydroxyl group becomes excessive relative to the number of isocyanate group, in order to make easy its reaction with the polyurethane having an isocyanate group at each terminal and complete the reaction in a short time while suppressing the side reaction. The compound having hydroxyl group and ethylenically unsaturated bond is added so that the number of hydroxyl group is ordinarily about 2–5 times the number of isocyanate group. As a result, there is obtained a mixture of a polyurethane having ethylenically unsaturated bond and an excessive hydroxyl group-containing ethylenically unsaturated compound.

In the process which comprises first synthesizing a polyurethane having a hydroxyl group at each terminal and then reacting it with a compound having isocyanate group and ethylenically unsaturated bond, the compound having isocyanate group and ethylenically unsaturated bond is added so that the number of isocyanate group becomes generally equal to or smaller than the number of hydroxyl group of the polyurethane. At that time, it is preferable to add, as a diluent, a component not taking part in the urethanization and thereby reduce the viscosity of the reaction system, in order to enable easier stirring and suppress the side reaction. When the compound having isocyanate group and ethylenically unsaturated bond is added in excess, it is necessary to add, after the completion of the reaction, a compound having active hydrogen (e.g. hydroxyl group) to eliminate the isocyanate group.

As the diol compound, there can be mentioned compounds having two hydroxyl groups in the molecule, for example, polyester diols such as poly(propyleneglycol adipate)diol, poly(neopentylglycol adipate)diol, polycaprolactone diol, polyvalerolactone diol and the like, and polyether diols such as polyethylene glycol, polypropylene glycol, polytetramethylene glycol and the like.

The molecular weight of the diol compound is ordinarily about 400–2,000 and, in order to obtain a tougher cured product, is preferably about 500–1,000.

As the diisocyanate compound, there can be mentioned compounds having two isocyanate groups, for example, tolylene diisocyanate, hexamethylene diisocyanate, xylylene diisocyanate and isophorone diisocyanate. Of these, tolylene diisocyanate is preferred because a hard and tough cured product can be obtained easily without increasing the viscosity of the polymer excessively.

As the compound having hydroxyl group and ethylenically unsaturated group, there can be mentioned, for example, hydroxyethyl acrylate, hydroxypropyl acrylate, hydroxyethyl methacrylate, hydroxypropyl methacrylate, N-methylolacrylamide, polyoxyethylene glycol monomethacrylate and polyoxypropylene glycol monomethacrylate. Of these, hydroxyethyl methacrylate and hydroxypropyl methacrylate are preferred in view of the hardness and toughness of polymer obtained, and hydroxypropyl methacrylate is most preferred because a polymer of high hardness can be obtained.

As the compound having isocyanate group and ethylenically unsaturated group, there can be mentioned, for example, a compound obtained by adding a diisocyanate compound to a compound having hydroxyl group and ethylenically unsaturated group, at a 1:1 ratio.

The thus obtained unsaturated polyurethane is desired to have a polystyrene-reduced number-average molecular weight of 800–9,000 as measured by GPC. A smaller molecular weight is advantageous because it can give a photosensitive resin composition of lower viscosity; however, a molecular weight of smaller than 800 is not preferred because with such a low viscosity, the resulting photosensitive resin composition gives a cured duplicate model which is hard, brittle and low in toughness and which easily cracks when the unnecessary portions are cut and removed.

With a large molecular weight, toughness of cured duplicate model is easy to obtain; however, with a molecular weight of larger than 9,000, the resulting photosensitive resin composition has a high viscosity, it is difficult to cast the resin composition into all the portions of a mold, and the cured duplicate model has undesirable properties in hardness (no sufficient hardness is obtained), etc.

As the ethylenically unsaturated compound, there can be mentioned, for example, N-substituted acrylamides and N-substituted methacrylamides such as N-methylolacrylamide, diacetoneacrylamide, N,N-dimethylacrylamide, N-(2-methoxyethyl)acrylamide, N-methylolmethacrylamide, N,N-dimethylmethacrylamide and the like; hydroxyalkyl methacrylates or acrylates such as hydroxyethyl methacrylate or acrylate, hydroxypropyl methacrylate or acrylate, and the like; polyoxyethylene glycol dimethacrylates or diacrylates, such as ethylene glycol dimethacrylate or diacrylate, diethylene glycol dimethacrylate or diacrylate, tetraethylene glycol dimethacrylate or diacrylate, and the like; polyoxypropylene glycol dimethacrylates or diacrylates, such as propylene glycol dimethacrylate or diacrylate, dipropylene glycol dimethacrylate or diacrylate, tripropylene glycol dimethacrylate or diacrylate, and the like; butanediol dimethacrylate or diacrylate; hexanediol dimethacrylate or diacrylate; nonanediol dimethacrylate or diacrylate; trimethylolpropane trimethacrylate or triacrylate; and diacrylates or dimethacrylates, each having a bisphenol A skeleton.

Of these, N-methylolacrylamide and N-methylolmethacrylamide are preferred in order to allow a duplicate model obtained to have high hardness and heat resistance without largely reducing its toughness; and diacetoneacrylamide is preferred in order to allow a duplicate model obtained to have high toughness without largely reducing its hardness and heat resistance. Hydroxyethyl methacrylate, hydroxypropyl methacrylate, trimethylolpropane trimethacrylate, etc. are suitable when it is desired to produce a photosensitive resin composition of low viscosity and further obtain a duplicate model of high elongation, hardness, etc. A diacrylate or dimethacrylate having a bisphenol A skeleton is suitable when it is desired to obtain a duplicate model having high hardness and heat resistance while allowing the model to retain toughness. These ethylenically unsaturated compounds are ordinarily used in combination of two or more kinds.

The polymer of 800–9,000 molecular weight having ethylenically unsaturated group in the molecule and the ethylenically unsaturated compound are used in proportions of generally 100 parts by weight (the former) and 60–200 parts by weight (the latter).

As the photopolymerization initiator used in the photosensitive resin composition, there can be used a known photopolymerization initiator which, when absorbing an ultraviolet light of 300–400 nm wavelength, can generate a free radical and give rise to polymerization. Specific examples of the photopolymerization initiator are benzoin derivatives such as benzoin methyl ether, benzoin ethyl ether, benzoin isopropyl ether, benzoin isobutyl ether, benzoin n-butyl ether, α-methylolbenzoin methyl ether, α-methoxybenzoin methyl ether, α-ethoxybenzoin ethyl ether and the like; 1-hydroxycyclohexylphenylacetophenone; and 1-benzyl-1-dimethylaminopropyl-p-morpholinoketone. Of these, α-methoxybenzoin methyl ether is particularly preferred because it can produce even a cured duplicate model of high curing rate and large thickness.

The amount of the photopolymerization initiator used can be an amount capable of initiating polymerization effectively, but is ordinarily 0.1–10% by weight based on the total amount of the photosensitive resin composition. When the amount is less than 0.1% by weight, the efficiency of photopolymerization initiation is low, the curing of the photosensitive resin composition particularly at the interface with the silicone rubber (mold) is insufficient, and the duplicate model obtained has, in some cases, stickiness on the surface. Conversely, when the amount is too large, the duplicate model obtained has reduced mechanical properties. The amount is preferably 0.5–4% by weight, more preferably 1–2.5% by weight.

It is possible to further add, to the photosensitive resin composition, a stabilizer such as known thermal polymerization inhibitor or the like to secure the stability of the photosensitive resin composition during production or storage. Examples of such a stabilizer are p-methoxyphenol and 2,6-di-tert-butyl-p-cresol.

The photosensitive resin composition has a viscosity of 300 p or less, preferably 200 p or less, more preferably 150 p or less at 20° C. so that the air bubbles which come to be contained in the photosensitive resin composition during the operation, can be easily removed and the photosensitive resin composition can be filled into all the portions of the silicone rubber mold. The viscosity of the photosensitive resin composition can be lowered by increasing the content of the ethylenically unsaturated compound (use of a liquid ethylenically unsaturated compound is particularly effective). A liquid ethylenically unsaturated compound having a low molecular weight can greatly reduce the viscosity of the photosensitive resin composition. Addition of a liquid plasticizer, for example, a silicone oil in such an amount that the other properties of the photosensitive resin composition are not substantially impaired, is also effective for the viscosity reduction.

When the photosensitive resin composition for cast molding has a high viscosity, the viscosity can be reduced at the time of casting, by heating the composition. The temperature to which the resin composition is heated, must be carefully selected so that the resin composition causes no quality deterioration because the resin composition may cause quality deterioration depending upon the temperature level.

The silicone rubber used as a mold in the present invention can be any silicone rubber as long as it can transmit an ultraviolet light. A commercial room temperature-curable (RTV) transparent silicone rubber is ordinarily used. A translucent silicone rubber or an ultraviolet-curable silicone rubber may also be used as long as it can transmit an ultraviolet light of such an amount that is required for the curing of the photosensitive resin composition for cast molding.

The room temperature-curable RTV silicone rubber is a two-pack type requiring complicated handling and, moreover, needs one night for curing. Meanwhile, the ultraviolet-curable silicone rubber is preferable because it is a one-pack type and easy to handle, is cured in a short time (about 10–20 minutes), and can be made into a mold in a short time.

The silicone rubber is classified into an addition type and a condensation type depending upon the curing mechanism. The condensation type is not preferable with respect to the dimensional accuracy because low-molecular compounds are formed during condensation and, when they leave the reaction system, rubber shrinkage occurs at the same time with rubber curing. Therefore, the addition type causing no shrinkage is preferred.

The present photosensitive resin composition for cast molding can produce a duplicate model having a high dimensional accuracy of 0.3% or less. When a higher dimensional accuracy is required depending upon the shape of master model or the application of duplicate model obtained, it is effective that the temperature at which the photosensitive resin composition for cast molding is cast into a mold and is cured by the application of an ultraviolet light, is kept higher by 50° C. or less, than the temperature at which the silicone rubber is cured to form a mold.

The silicone rubber has a thermal expansion coefficient fairly larger than that of the photosensitive resin composition for cast molding. Therefore, the photosensitive resin composition cast into a silicone rubber mold is cured in a state that the mold is swollen to a size larger than the size of the master model. Meanwhile, the cured photosensitive resin composition shows small shrinkage even when its temperature decreases. Therefore, the shrinkage of the resin composition appearing during its curing is made up for and a duplicate model of high dimensional accuracy can be obtained.

The silicone rubber is cured generally at 25–40° C. because this curing temperature can be easily kept constant. The silicone rubber mold is used desirably at a temperature of 80° C. or less because the silicone rubber mold is easy to handle for cast molding at such a temperature.

Too large a temperature difference between during mold production and during cast molding may allow the duplicate model obtained to have a dimension larger than the dimension of the master model. Therefore, the temperature difference between during mold production and during cast molding must be determined in an appropriate range.

The light source used in photocuring can be any as long as it can emit an ultraviolet light of 300–400 nm wavelength. There can be used a light source ordinarily used in curing of photosensitive resin, such as ultraviolet fluorescent lamp, high-pressure mercury lamp, metal halide lamp, xenon lamp or the like.

In production of duplicate model, it is necessary that an ultraviolet light is applied, for photocuring, from six directions (above and below, left and right, and front and back), unlike the case of printing plate production or resist baking. Therefore, the light sources are desired to be provided at the above six positions. The number of light source positions can be reduced by the use of a reflector but, even in that case, the shape and position of reflector are desired to be determined so that a light can be applied from the above six direction. The light application only from two directions (above and below) as in printing plate production is not preferred because curing becomes insufficient at the portions of the photosensitive resin composition corresponding to the side of duplicate model obtained, generating defectives.

When a large duplicate model is produced by photocuring, it is preferable that a resin is irradiated in a cylindrical exposure apparatus having light sources at above, below, left and right, or a resin is irradiated while being placed on a conveyor or the like and moved in the above cylindrical exposure apparatus.

The mode for carrying out the present invention is hereinafter described more specifically with reference to Examples and Comparative Examples. However, the present invention is not restricted to these Examples.

Incidentally, in the present invention, measurement of ultraviolet transmittance was conducted as follows.

There were prepared two 4 mm-thick soda-lime glass sheets each onto which a 12 $\mu$m-thick polyester film was adhered tightly. The two glass sheets were piled and placed below a light source comprising ten 60-W ultraviolet fluorescent lamps (10R, a product of Phylips) having central wavelength of 370 nm placed horizontally. Below the two glass sheets was placed a sensor, i.e. an ultraviolet intensity tester (UV LIGHT MEASURE, MODEL UV-M02, a product of ORC) to measure an ultraviolet intensity A, which was 4.9 mW/cm$^2$.

Next, on the polyester film of one glass sheet used above was placed a 1 mm-thick teflon-made spacer. Inside the space was poured a photosensitive resin composition for cast molding. Thereon was laminated another glass sheet also used above so that the polyester film of this glass sheet came in contact with the photo-sensitive resin composition, whereby the photosensitive resin composition was allowed to have a thickness of 1 mm. The resulting laminate was placed below the above-mentioned light source to measure an ultraviolet intensity B. The ultraviolet transmittance was determined as B÷A×100.

EXAMPLE 1

By using an ABS-made master model having a 2-mm thickness and a shape as shown in FIG. 1 and by curing, at 40° C., a room temperature-curing transparent silicone rubber (KE-1606, a product of SHIN-ETSU KAGAKU KOGYO K.K.) which had been degassed under vacuum, a mold for cast molding was produced.

Into a 2-liter separable flask was fed 1,000 g of a polycaprolactonediol having a molecular weight of 500.

Thereto was added 410 g of tolylene diisocyanate to give rise to an urethanization reaction to obtain a polymer having isocyanate group at both terminals. Then, 410 of 2-hydroxypropyl methacrylate (307 g of 410 g was added as a dilution monomer) was added to react with the isocyanate group of the polymer, whereby was obtained a urethane polymer of 8,000 number-average molecular weight having methacrylate group at both terminals. There were mixed 120 g of the polymer (120 g contained 20 g of 2-hydroxypropyl methacrylate as dilution monomer), 20 g of N-methylolacrylamide, 20 g of methacrylamide, 40 g of 2-hydroxypropyl methacrylate, 5 g of α-methoxybenzoin methyl ether, 0.2 g of 2,6-di-tert-butyl-p-cresol and 20.5 g of calcium carbonate having an average particle diameter of 0.7 μm [Softon 3200 (trade name), a product of Bihoku Hunka Kogyo K.K.], whereby was obtained a photosensitive resin composition for cast molding, having a viscosity of 80 p at 20° C. The photosensitive resin composition had an ultraviolet transmittance of 0.57% as measured at a thickness of 1 mm.

The photosensitive resin composition was heated to 40° C and degassed under reduced pressure with stirring, and then poured into the above-produced silicone rubber mold heated to 65° C. The silicone rubber mold was placed in an exposure apparatus having 40-W ultraviolet fluorescent lamps (having a central wavelength of 370 nm) provided at above, below, left, right, front and back, and was subjected to ultraviolet irradiation for 10 minutes. Then, the mold was opened to take out a duplicate model consisting of a cured photosensitive resin composition.

The duplicate model had a yellowish opaque white color and was opaque. It had a Shore D hardness of 83 at 20° C. and caused no cracking when cut by a nipper.

The dimensions of the duplicate model at the given sites were measured by the use of a slide calipers. The results are shown in Table 1.

EXAMPLE 2A and 2B

Two photosensitive resin compositions for cast molding were obtained in the same manner as in Example 1 except that the addition amount of calcium carbonate was changed. The photosensitive resin compositions were subjected to cast molding in the same manner as in Example 1. The resulting two duplicate models were both opaque. The dimensions of the duplicate models were measured by the use of a slide calipers. The results are shown in Table 1.

TABLE 1

| | Content of calcium carbonate | Ultra-violet trans-mittance | Dimensions of duplicate model at given sites Upper figure: dimension (mm) Down figure: shrinkage (%) | | |
|---|---|---|---|---|---|
| | (wt. %) | (%) | a | b | c |
| Example 1 | 10 | 0.57 | 119.76 | 59.55 | 29.95 |
| | | | 0.20 | 0.08 | 0.17 |
| Example 2A | 5 | 1.4 | 119.70 | 59.48 | 29.92 |
| | | | 0.25 | 0.20 | 0.27 |
| Example 2B | 15 | 0.31 | 119.78 | 59.55 | 29.97 |
| | | | 0.18 | 0.08 | 0.10 |
| Dimensions of master model | | | 120.00 | 59.60 | 30.00 |

EXAMPLE 3

By using an ABS-made sheet of 50 mm×20 mm×6 mm (thickness), a silicone rubber mold was produced in the same manner as in Example 1. The photosensitive resin composition of Example 1 was poured into the mold and subjected to ultraviolet irradiation, in the same manner as in Example 1. As a result, a completely cured opaque sheet-like duplicate model was obtained.

EXAMPLE 4

There were reacted 300 g of a poly-1,4-butylene glycol adipate diol having a molecular weight of 510 as determined from the hydroxyl value, 52.5 g of a polypropylene glycol having a molecular weight of 960 as determined similarly, and 173 g of tolylene diisocyanate, to obtain a polymer having isocyanate group at both terminals. Then, 303 g of 2-hydroxypropyl methacrylate (202 g of 303 g was added as a dilution monomer) was added to react with the isocyanate group of the polymer, whereby was obtained a urethane prepolymer of 2,300 number-average molecular weight having methacrylate group at both terminals.

There were mixed 124 g of the prepolymer (124 g contained 24 g of 2-hydroxypropyl methacrylate as dilution monomer), 26 g of 2-hydroxypropyl methacrylate, 7 g of tetraethylene glycol dimethacrylate, 15 g of a reaction product [3002M (trade name), a product of Kyoeisha Chemical Co., Ltd.] of a bisphenol A-propylene oxide adduct and glycidyl methacrylate, 3 g of 2,2-dimethoxy-2-phenylacetophenone and 0.2 g of 2,6-di-tert-butyl-p-cresol. They were made into a solution to obtain a photosensitive resin composition. The composition was mixed with 17 g of fibrous calcium carbonate [Wiscal A (trade name), a product of Maruo Calcium Co., Ltd.] to obtain a photosensitive resin composition for cast molding, having a viscosity of 100 p at 20° C. This photosensitive resin composition for cast molding had an ultraviolet transmittance of 1.2%.

The above photosensitive resin composition was heated to 40° C. and degassed under reduced pressure, and poured, under reduced pressure, into a transparent silicone rubber mold of 65° C. produced in the same manner as in Example 1. The mold inside was returned to normal pressure. Then, on and beneath the silicone rubber mold were placed an ultraviolet absorber-free polymethyl methacrylate sheet of 10 mm in thickness (DELAGLAS K, color No. 3002, a product of Asahi Chemical Industry Co., Ltd.), and the sheets were fixed to the mold by the use of a transparent tape. The silicone rubber mold supported by the polymethyl methacrylate sheets were placed in an exposure apparatus having 40-W ultraviolet fluorescent lamps provided at above, below, left, right, front and back, and was subjected to ultraviolet irradiation for 10 minutes.

After the irradiation, the mold was opened to take out a duplicate model consisting of a cured photosensitive resin composition. The duplicate model had a yellowish opaque white color and was opaque. It had a Shore D hardness of 84 at 20° C. and caused no cracking when cut by a nipper.

The dimensions of the duplicate model at the given sites were measured by the use of a slide calipers. The shrinkages of the duplicate model were about the same as in Example 1 and 0.08–0.2%.

EXAMPLE 5

A photosensitive resin composition for cast molding was obtained in the same manner as in Example 1 except that 20.5 g of calcium carbonate was changed to 0.041 g of 2-(2'-hydroxy-3'-tert-butyl-5'-methylphenyl)-5-chlorobenzotriazole. This photosensitive resin composition had an ultraviolet transmittance of 0.92%.

The resin composition was heated to 50° C. and degassed under reduced pressure with stirring, then poured into the same silicone rubber mold as used in Example 1, heated to 65° C., and subjected to ultraviolet irradiation in the same manner as in Example 1.

The resulting duplicate model was subjected to dimensional measurement at the given sites. The results are shown in Table 2.

The duplicate model had a Shore D hardness of 82 at 20° C. and caused no cracking when cut by a nipper.

Comparative Example 1

A photosensitive resin composition for cast molding was produced in the same manner as in Example 1 except that no calcium carbonate was added. This composition had an ultraviolet transmittance of 6.3%. Using the composition, a duplicate model was produced in the same manner as in Example 5. The results of dimensional measurement of the duplicate model at the given sites are shown in Table 2. The photosensitive resin composition had an ultraviolet transmittance of 6.7%.

EXAMPLES 6A and 6B

Two photosensitive resin compositions for cast molding a and b, having different ultraviolet transmittances, were produced in the same manner as in Example 5 except that the addition amounts of the ultraviolet absorber, 2-(2'-hydroxy-3'-tert-butyl-5'-methylphenyl)-5-chlorobenzotriazole were changed to 0.082 g and 0.123 g, respectively. Using these photosensitive resin compositions for cast molding, two duplicate models A and B were produced, respectively, in the same manner as in Example 5 and subjected to dimensional measurement at the given sites. The results are shown in Table 2.

TABLE 2

| | Ultra-violet trans-mittance | Dimensions of duplicate model at given sites Upper figure: dimension (mm) Down figure: shrinkage (%) | | |
|---|---|---|---|---|
| | (%) | a | b | c |
| Example 5 | 0.92 | 119.77 | 59.48 | 29.95 |
| | | 0.19 | 0.20 | 0.17 |
| Example 6A | 0.22 | 119.78 | 59.49 | 29.96 |
| | | 0.18 | 0.18 | 0.13 |
| Example 6B | 0.06 | 119.83 | 59.55 | 29.97 |
| | | 0.13 | 0.08 | 0.10 |
| Comparative Example 1 | 6.7 | 119.50 | 59.37 | 29.88 |
| | | 0.42 | 0.39 | 0.40 |
| Dimensions of master model | | 120.00 | 59.60 | 30.00 |

EXAMPLE 7

A photosensitive resin composition was obtained by mixing 100 g of diacrylate of a diol (an adduct of bisphenol A and 4 moles of ethylene oxide), 50 g of a diacrylate obtained by adding 2-hydroxyethyl acrylate to both terminals of hexamethylene diisocyanate, and 6 g of α-methoxybenzoin methyl ether. Using the composition, a measure having outer dimensions of 5 cm×5 cm×4 cm (height) and a wall thickness of 3 mm was produced in 20 hours by three-dimensional molding, and was used as a master model. The master model was set in the center of a box having internal dimensions of 13 cm×13 cm×13 cm (height), produced with a 10 mm-thick transparent polymethyl methacrylate sheet containing no ultraviolet absorber.

A photocurable silicone rubber composition was produced by mixing 1,000 g of a dimethylpolysiloxane having two terminals blocked with hydroxyl group, having a viscosity of 5,000 p at 25° C., 100 g of silica aerogel, 17 g of methacryloxypropyltrimethoxysilane, 10 g of tin dioctoate, 30 g of 2-ethylhexyl 2-trimethoxysilylpropionate, 50 g of a mercapto group-containing organopolysiloxane represented by the following formula, 20 g of diethoxyacetophenone and 5 g of dibutyltin dilaurate.

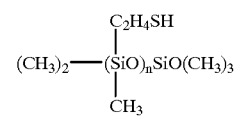

(wherein n is an integer at which the compound of the formula has a viscosity of 35 p at 25° C.).

The photocurable silicone rubber composition was poured into the above box. The box was placed in the same exposure apparatus as used in Example 1 and subjected to ultraviolet irradiation for 20 minutes.

After the irradiation, the cured silicone rubber was opened to take out the master model. The inside of the resulting mold was subjected to post-irradiation for 5 minutes in the same exposure apparatus, whereby a mold for cast molding was obtained.

There were reacted 680 g of a polycaprolactonediol having an average molecular weight of 500 as determined from the hydroxyl value, 450 g of a polypropylene glycol having an average molecular weight of 950 as determined from the hydroxyl value, and 371 g of tolylene diisocyanate, to obtain a polyurethane having isocyanate group at both terminals. The polyurethane was reacted with 345 g of 2-hydroxypropyl methacrylate to obtain an unsaturated polyurethane having a polystyrene-reduced number-average molecular weight of 5,800 as measured by GPC, wherein the chain was extended by urethane bond.

There were mixed 116 g of the above unsaturated polyurethane (116 g contained 16 g of 2-hydroxypropyl methacrylate as dilution monomer), 91 g of 2-hydroxypropyl methacrylate, 25 g of diacetonediacrylamide, 2.6 g of α-methoxybenzoin methyl ether, 0.2 g of 2,6-di-tert-butyl-p-cresol, 11 g of a leuco dye (3-dibutylamino-6-methyl-7-anilinofluoran) and 11 g of a photo-induced acid-generating agent (triarylsulfonium hexafluorophosphate), whereby was obtained a photosensitive resin composition for cast molding, having a viscosity of 60 p at 20° C. and an ultraviolet transmittance of 2.2% as measured at 1-mm thickness.

The photosensitive resin composition for cast molding was degassed at 40° C. under reduced pressure, then poured into the above mold, and subjected to ultraviolet irradiation for 10 minutes in the same manner as in Example 1. The mold was opened to take out a duplicate mold consisting of a cured photosensitive resin composition. The duplicate model had a slightly dark gray color. When subjected to post-irradiation for further 10 minutes, the mold turned completely black. The duplicate model had a Shore D hardness of 82. The duplicate model was subjected to dimensional measurement at the given sites and the results are shown in Table 3.

TABLE 3

|  | Ultraviolet transmittance (%) | Dimensions of duplicate model at given sites Upper figure: dimension (mm) Down figure: shrinkage (%) | | |
| --- | --- | --- | --- | --- |
|  |  | Width | Depth | Height |
| Example 7 | 2.6 | 49.91 | 49.92 | 39.92 |
|  |  | 0.18 | 0.16 | 0.20 |
| Dimensions of master model |  | 50.00 | 50.00 | 40.00 |

This application is based on Japanese Patent Application No. 08-205466 filed on July 17, 1996, No. 08-205467 filed on Jul. 17, 1996, No. 08-252894 filed on Sep. 25, 1996, No. 08-205468 filed on Jul. 17, 1996 and No. 09-055444 filed on Feb. 25, 1997, the contents of which are in their entirety incorporated hereinto by reference.

What is claimed is:

1. A photosensitive resin composition for cast molding, wherein said photosensitive resin composition is liquid capable of being cured upon irradiation with light and has an ultraviolet transmittance of 0.05–5% as measured at a 1-mm thickness.

2. A photosensitive resin composition for cast molding according to claim 1, which contains an ultraviolet absorber.

3. A photosensitive resin composition for cast molding according to claim 1, which contains an inorganic filler.

4. A photosensitive resin composition for cast molding according to claim 3, wherein the inorganic filler is at least one compound selected from the group consisting of calcium carbonate, magnesium carbonate, magnesium hydroxide and magnesium oxide.

5. A photosensitive resin composition for cast molding according to any one of claims 1–4, which contains a compound changing its color or developing a color upon irradiation with an ultraviolet light.

6. A photosensitive resin composition for cast molding according to claim 5, which contains:

a photopolymerization initiator generating a free radical upon irradiation with an ultraviolet light, a leuco dye, and a compound generating an acid upon irradiation with an ultraviolet light.

7. A photosensitive resin composition for cast molding according to claim 6, which contains a polymer of 800–9,000 molecular weight having ethylenically unsaturated bond in the molecule and an ethylenically unsaturated compound having a molecular weight of smaller than 800.

8. A photosensitive resin composition for cast molding according to claim 7, which further contains a photopolymerization initiator.

9. A photosensitive resin composition for cast molding according to claim 8, wherein the polymer is an unsaturated polyurethane or an unsaturated polyester.

* * * * *